May 5, 1953  G. E. VALLEY, JR  2,637,846
RECORDING PLAN POSITION INDICATOR
Filed Sept. 14, 1945

INVENTOR
GEORGE E. VALLEY, JR.

BY
ATTORNEY

Patented May 5, 1953

2,637,846

UNITED STATES PATENT OFFICE 2,637,846

RECORDING PLAN POSITION INDICATOR

George E. Valley, Jr., Cambridge, Mass., assignor, by mesne assignments, to the United States of America as represented by the Secretary of the Navy Application September 14, 1945, Serial No. 616,399

5 Claims. (Cl. 343—5)

The present invention relates in general to the problem of recording for future use information presented by a radio echo detection system and in particular to the combination with a radio echo detection system of the automatic scanning type of a facsimile recorder to produce a permanent map of the region about the system.

It is possible with a radio echo detection system automatically to scan a region in space or on the surface of the earth and to present a visual image thereof on the face of a cathode ray tube indicator. Systems of this kind may be arranged to scan all around or in only a chosen sector. Further, the region to be scanned may be limited to one having predetermined nearer and farther distances from the system. In addition, the system may be carried by a surface craft or aircraft so that the region being scanned is constantly changing. In any case, the information presented by the indicator soon vanishes and becomes thereafter unavailable except for the memory of an observer.

It is desirable for many reasons to preserve a record of the above mentioned information. For example, a radio echo detection system set up near a highway would "see" automobiles passing during the day and night and a record of what the system "sees" would be valuable in checking traffic, the speed thereof and furnishing a record of accidents. Similarly, such an arrangement could provide a record of harbor traffic for maritime use. Another desirable use for a recording echo detection system would be that of map making or terrain survey. The system could be carried in an aircraft during the day or night time and a record of successive substantially instantaneous "looks" at strips of the terrain beneath would constitute a map of the entire terrain surrounding the path over which the craft would have flown. This last mentioned use has already been exploited in the case of daytime optical photography. The methods and means proposed are hereinafter applied to this last specific problem of aerial survey of terrain. It will be apparent, however, that the principles of my invention may be employed in the solution of numerous other problems of the general character hereinabove indicated.

Prior known methods of preserving the information presented by a radio echo detection system have in most cases involved the use of photography. Such arrangements have provided successive still photographs of the instantaneous appearance of the cathode ray tube indicator of the system. These photographs provide only instantaneous "looks" at the surrounding terrain. A system for transmitting the information presented by an airborne radio echo detection system involving the use of a television camera and television transmission equipment may also suggest itself, but such a system has the obvious defect that very heavy television cameras and radio transmitters must be carried in the aircraft which is carrying the radio echo detection system. In my invention I propose to combine a known facsimile recorder, of which many types are available, with a radio echo detection system in such fashion as to provide a permanent record of the terrain about the system. The recorder will provide this record on the usual and ordinary reproducing paper used by such facsimile recorders. It will be obvious that the system that my invention proposes is readily adaptable to the radio transmission of recorder information to remote receiving stations in the manner common to the radio transmission of photographs as now in use in the newspaper and other industries.

It is accordingly an object of my invention to provide in combination a radio echo detection system and a facsimile recorder for preserving a permanent record of the information presented by the said system.

It is a further object of my invention to provide such a combined radio echo detection system and facsimile recorder as will when carried in an aircraft or other craft produce a map of the terrain over which the craft has passed.

It is a still further object of my invention to provide such a combined system that will be light in weight, simple to operate and easy to manufacture.

It is a still further object of my invention to provide such a combined system that will be readily able to transmit its recorded information to remote receiving stations by means of ordinary radio transmission.

Other objects and features of my invention will become apparent upon a careful consideration of the following detailed description when taken together with the accompanying drawing, the figures of which illustrate typical embodiments of the invention.

Figure 1:
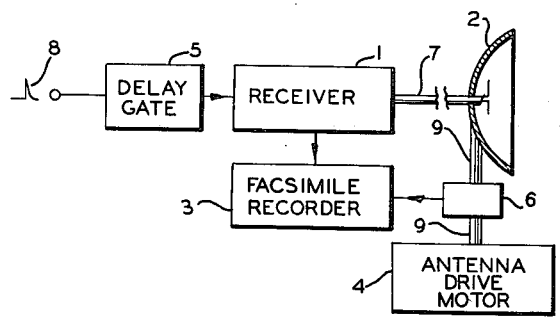
Fig. 1 illustrates in block diagram and partly in cross section the antenna and receiver of a radio echo detection system in combination with a facsimile recorder.

In Fig. 1, a receiver 1 and an antenna 2 of the directive type, components of a complete radio echo detection system (not shown), are combined with a facsimile recorder 3 to provide a system of my invention. However, any one of a number of types of facsimile recorders can be utilized in the invention. "The Radio Engineering Handbook," edited by Keith Henney, third edition, McGraw-Hill, 1941, in Section 20 thereof, treats of the art of facsimile in general and describes suitable recorders for use in this invention. The antenna 2 is driven through a suitable shaft 9 by an antenna drive motor 4 adapted to cause the antenna 2 to scan a region about the radio echo detection system. A delay gate circuit 5 of the type described in pages 2–32 et seq. of "Principles of Radar," edited by the Staff of the M. I. T. Radar School, Technology Press, Massachusetts Institute of Technology, Cambridge, Massachusetts, 1944, causes the receiver 1 to become operative during a predetermined portion only of the duty cycle of the radio echo detection system. A synchronizing device 6 illustrated in block form is provided for the purpose of synchronizing the stylus or recording portion of the facsimile recorder 3 with the azimuth position of the antenna 2. The apparatus of Fig. 1 is placed in operation by a trigger pulse 8 which may be positive or negative as desired and occurs simultaneously with the transmission of a radio energy pulse by the complete radio echo detection system. The trigger pulse 8 occurs at the beginning of each duty cycle of the radio echo detection system.

The operation of the apparatus of Fig. 1 is as follows. When the radio echo detection system transmits a pulse, a trigger pulse 8 is simultaneously furnished to the delayed gate apparatus 5. The delayed gate apparatus 5 provides a relatively narrow gate voltage pulse of the rectangular type to the receiver 1 and effectively turns on that receiver 1 for a predetermined relatively small portion of the duty cycle of the radio echo detection system. The gate voltage pulse may be, for example, of 12.3 microseconds' duration. Thus the receiver 1 is able to receive echoes from only a certain small predetermined portion of the region being scanned during each duty cycle, in this exemplary case a one mile portion thereof. The antenna 2 is of the directive type common to radio echo detection systems and receives returning echoes and furnishes these echoes to the receiver 1 through a suitable flexible transmission line 7. The receiver 1 performs the normal function of converting the received radio frequency echoes to low frequency audio pulses and furnishes these pulses to the facsimile recorder 3. The audio frequency pulses furnished to the facsimile recorder 3 are similar in nature to the ordinary electrical intelligence usually furnished to such facsimile recorders in their normal use. In order that the stylus or other recording or imprinting mechanism of the facsimile recorder will properly trace itself across the face of the recorder drum in synchronism with the azimuth position of the antenna 2, a synchronizing mechanism 6 is provided to drive the imprinting mechanism. The synchronizing mechanism 6 may be of the synchromotor type or of the mechanical cam type or of other types easily fabricated by mechanics or electricians skilled in their art. The antenna drive motor normally will cause the antenna 2 to rotate about the entire system and to "look" at the entire region about the radio echo detection system. The antenna drive motor 4 may also be arranged in known fashion to cause the antenna 2 to oscillate and "look" only at a portion of the region about the radio echo detection system.

Figure 2:
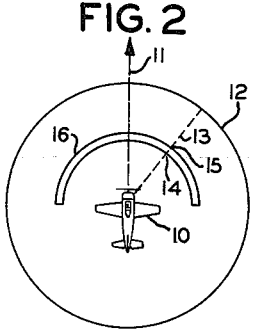
Fig. 2 illustrates the type of strips of terrain recorded by the system of Fig. 1 when airborne.

As illustrated in Fig. 2, the apparatus of Fig. 1 may be carried in an aircraft 10 flying in a direction 11 indicated by a dotted line. The antenna 2 would then normally scan the region about the aircraft 10 as indicated by a circle 12. During a particular duty cycle of the aforementioned complete radio echo detection system associated with the apparatus of Fig. 1, the antenna 2 may be considered as "looking" in a direction 13 indicated by a dotted line. The trigger pulse 8 will start at the center of the circle 12, simultaneously with the start of the dotted line 13 at the center of that circle 12. The delayed gate 5 will turn on the receiver 1 at that time when the sweep of the radio echo detection system has arrived at a first distance 14 away from the aircraft 10, and will turn off the receiver when the said sweep has arrived at a subsequent further distance 15 away from the aircraft 10. Thus the receiver 1 will receive echoes only from a small portion, as for example one mile, of successive sweeps as such sweeps occur during successive duty cycles of the radio echo detection system, and also as the antenna 2 is scanned about the aircraft 10. The sections of sweep "looked" at by the receiver 1 will form an arcuate strip 16 having, for example, a width of one mile and this strip 16 of the terrain about the aircraft 10 will be the strip viewed by the receiver 1. The strip 16 may be arranged in known fashion to be a 180° arc or an arc of lesser or greater size. It is obviously not desirable to have more than 180° of arc in the strip 16, for, as the aircraft 10 moves forward in the direction 11, successive strips 16 will be viewed by the radio echo detection system and recorded by the facsimile recorder 3. Thus a map of the terrain over which the aircraft 10 is flying will be formed by the facsimile recorder 3.

As the aircraft 10 moves forward the terrain beneath will in effect move across the strip 16, while simultaneously the recording paper of the facsimile recorder is moved therethrough at an appropriate rate of speed. The presence of reflections from any part of the strip 16 will be noted on the facsimile recorder paper in a manner adapted to produce a map. If the aircraft 10 changes its course, a distortion will occur during the turn, but thereafter, if straight flight is resumed, another reasonably accurate map will be produced. It is evidently desirable that the flight speed of the aircraft 10 and the scanning speed of the antenna 2 be so chosen, in operation, that upon the commencement of a new scan, the aircraft 10 will have moved forward a distance substantially equal to the width of the strip 16.

Figure 3:
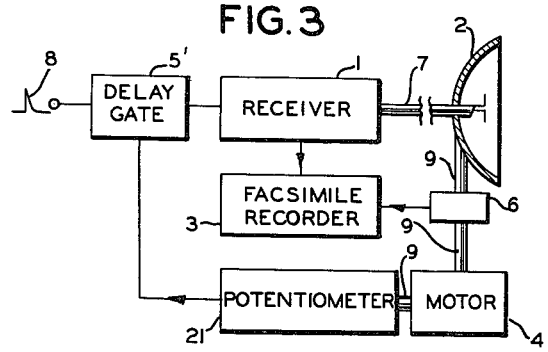
Fig. 3 illustrates a second embodiment of the invention adapted to form a map of straight strips of the terrain over which the system may be carried.

In Fig. 3 is illustrated an improved embodiment of my invention. The apparatus of Fig. 3 is identical in some respects to the apparatus of Fig. 1 and identical elements of each apparatus have similar reference characters. The antenna drive motor 4 drives an additional apparatus 21 in Fig. 3 which comprises desirably a potentiometer (not shown) for varying the occurrence of the delay gate 5' in accordance with the azimuth angle of the antenna 2 as will hereinafter be explained.

Figure 4:
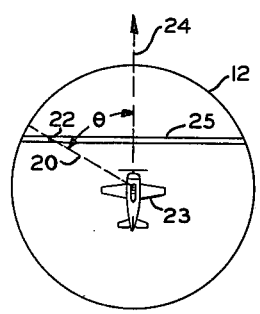
Fig. 4 illustrates the type of strips of terrain recorded by the system of Fig. 3.

The apparatus of Fig. 3 operates in the same manner as the apparatus of Fig. 1 insofar as the receiving of echoes and the presenting of signals to a facsimile recorder are concerned. The difference however resides in the ability of the apparatus of Fig. 3 to vary the occurrence of the delay gate 5' with each successive duty cycle or sweep of the radio echo detection system. Thus, for example, as illustrated in Fig. 4, when the antenna 2 is pointing to a position 22 at the extreme left of the aircraft 23 carrying the apparatus the delay gate 5' occurs relatively late in this particular sweep of the radio echo detection system. As the antenna 2 is scanned to the right toward a forward position the delay gate 5' occurs relatively earlier in each successive sweep, and occurs earliest in the sweep representing the antenna 2 "looking" in a due forward direction 24. As the antenna is continued to be scanned to the right, away from the due forward direction 24, the delay gate 5' occurs in a progressively later position in each succeeding sweep of the radio echo detection system. Thus the strip 25 scanned, and received by the receiver 1 lies substantially perpendicular to the direction 24 in which the aircraft 23 is moving and is, as will be hereinbelow explained, a substantially straight strip. The map formed from such strips 25 is thus a map formed by recording a series of substantially straight strips 25 rather than a series of arcuate strips 16. Such a map will have less distortion than a map formed from a series of arcuately shaped strips 16. The aircraft 23 and the aircraft 10 are similar and each may be considered to be carrying radio echo detection equipment that is able to scan a region completely about the said aircrafts as indicated by a circle 12.

In order that a suitable potentiometer 21 may cause variations in the occurrence of the delay gate 5' that will result in the scanning of straight strips 25, the potentiometer 21 should be wound in such a fashion as to follow some function of the angle $\theta$ between the instantaneous direction 20 in which the antenna 2 is pointing and the forward direction 24. Such a suitable function is "secant $\theta$." It is usual in the potentiometer art to wind potentiometers to follow these functions. The potentiometer 21 may then, in a known and usual fashion, vary a suitable potential in the gate generator 5' to cause the gate voltage pulse to occur earlier or later with respect to the trigger pulse 8.

Figure 5:
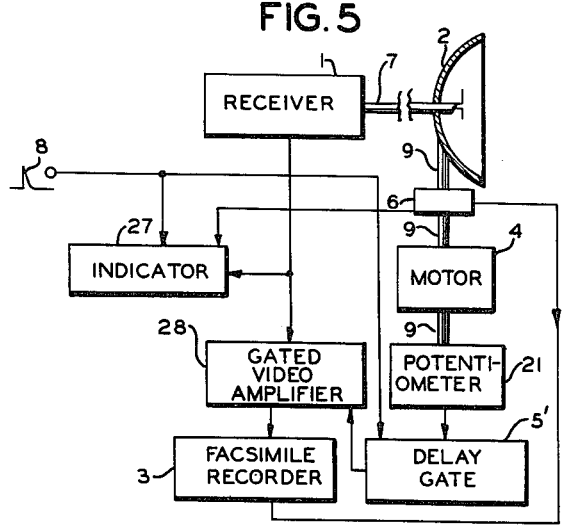
Fig. 5 illustrates a third embodiment of a combined radio echo detection and facsimile recorder system of my invention having therein the usual indicator of such a radio echo detection system in addition to the facsimile recorder.

In the apparatus of Fig. 5, a slight modification has been made to permit an ordinary radio echo detection system indicator 27 to be included therein. The parts included in the apparatus of Figs. 1 and 3, are retained without change of reference characters, or in the nature of their respective functions. However, in the present apparatus the receiver 1 is not gated but is operative during the entire sweep of the radio echo detection system. Thus the receiver 1 is able to receive echoes during an entire sweep of the said radio echo detection system and to present these echoes to an indicator 27 in the usual and normal fashion for such systems. A video amplifier 28 is also fed by the receiver 1 and this amplifier is gated by the delay gate 5' in the same manner as the receiver 1 of the apparatus of Fig. 3. The video amplifier 28 then feeds signals to the facsimile recorder 3 which are similar to the signals fed to the recorder by the receiver of the apparatus of Fig. 3. Thus the system of Fig. 5 will perform the dual function of providing an indicator 27 for visual observation and an apparatus for facsimile recording so that a map of the terrain over which the system is being carried can be furnished at the same time as the system is being used for usual and normal visual operation.

I am fully aware of the many modifications possible of the embodiments shown of my invention and of the various uses to which my invention may be put. Further, it must be borne in mind that the various fixed values, mentioned by way of example, in connection with discussion of the range gate 5 and the strip 16 are by way of example only, and not in any way to be construed as limiting. For example, the width of a strip 16 or 25 may be 500 yards, or any other convenient size, obtainable by adjustment of the gate generator 5 in a fashion known to the art. Therefore, this invention is not to be limited except insofar as is necessitated by the prior art and the spirit of the appended claims.

I claim:

1. A regional mapping system comprising, in combination, a moving radio echo detection system having at least a circular-scanning antenna, a modulator and a receiver, a delay gate voltage circuit responsive to trigger voltages from said modulator, a facsimile recorder driven in synchronism with said antenna, said receiver impressing signals upon said facsimile recorder in response to gate voltage pulses from said delay gate voltage circuit.

2. A regional mapping system comprising, in combination, a moving radio echo detection system having at least a circular-scanning antenna, an antenna drive motor, a modulator, and a receiver, a facsimile recorder driven in synchronism with said antenna by said antenna drive motor, a delay gate voltage circuit responsive to trigger voltages from said modulator and to the instantaneous scanning position of said antenna, said receiver being coupled to said facsimile recorder and transferring signals thereto in response to gate voltages from said delay gate voltage circuit.

3. A regional mapping system comprising, in combination, a moving radio echo detection system having at least a circular-scanning antenna, an antenna drive motor, a modulator and a receiver, a facsimile recorder driven in synchronism with said antenna by said antenna drive motor, a voltage dividing potentiometer having a variable voltage tap, said voltage tap also being driven in synchronism with said antenna, a delay gate voltage circuit operable in response to trigger voltages from said modulator and providing a voltage pulse determined in time by the position of said potentiometer variable voltage tap, said receiver being coupled to said facsimile recorder and providing signals thereto in response to said delayed voltage pulses from said delay gate voltage circuit.

4. A regional mapping system comprising, in combination with a radio echo detection system having at least a scanning antenna, a modulator and a receiver, of a facsimile recorder driven in synchronism with said antenna, a delay gate voltage circuit providing a voltage pulse determined in time by a control signal applied thereto, means coupled to said delay gate voltage for providing an adjustable control signal, means coupling said receiver to said facsimile recorder, and means coupling said delay gate voltage circuit to said receiver to periodically energize said receiver whereby echoes from said receiver are supplied to said facsimile recorder during portions of the scan of said antenna selected by the adjustment of said control signal.

5. A regional mapping system comprising, the combination with a radio echo detection system having at least a circularly scanning antenna, a modulator, and a receiver, of a facsimile recorder driven in synchronism with said antenna, a voltage dividing potentiometer having a variable tap and a resistance element, the resistance of which element varies as a secant function, said variable tap also being driven in synchronism with said antenna, a delay gate voltage circuit responsive in operation to voltage triggers from said modulator and providing a voltage pulse determined in time by the position of said potentiometer variable tap, means coupling said receiver to said facsimile recorder, and means coupling said delay gate voltage circuit to said receiver to periodically energize said receiver for providing echoes from said receiver to said facsimile recorder during a selected portion of the scan of said antenna.

GEORGE E. VALLEY, Jr.

References Cited in the file of this patent

UNITED STATES PATENTS

| Number | Name | Date |
| --- | --- | --- |
| 2,403,562 | Smith | July 9, 1946 |
| 2,406,406 | Sandretto et al. | Aug. 27, 1946 |
| 2,410,424 | Brown | Nov. 5, 1946 |
| 2,412,670 | Epstein | Dec. 17, 1946 |
| 2,415,981 | Wolff | Feb. 18, 1947 |
| 2,418,490 | Turner, Jr. | Apr. 8, 1947 |
| 2,422,135 | Sanders, Jr. | June 10, 1947 |
| 2,422,295 | Eaton | June 17, 1947 |
| 2,430,307 | Smith | Nov. 4, 1947 |
| 2,492,120 | Smith | Dec. 20, 1949 |